United States Patent
Soshi et al.

[11] Patent Number: 6,072,173
[45] Date of Patent: Jun. 6, 2000

[54] ANIMAL BODY DETECTING SYSTEM UTILIZING ELECTROMAGNETIC WAVES

[75] Inventors: Kunihiko Soshi, Ushiku; Takeshi Nakane, Okazaki, both of Japan

[73] Assignee: Aisin Seiki Kabushiki Kaisha, Kariya, Japan

[21] Appl. No.: 09/081,616

[22] Filed: May 20, 1998

[30] Foreign Application Priority Data

May 20, 1997 [JP] Japan .................................. 9-130034

[51] Int. Cl.[7] .................................................. G08G 1/16
[52] U.S. Cl. ........................ 250/221; 340/435; 340/903
[58] Field of Search ................................ 250/221, 222.1; 340/435, 436, 903; 342/70, 85

[56] References Cited

U.S. PATENT DOCUMENTS

| | | | |
|---|---|---|---|
| 5,227,784 | 7/1993 | Masamori et al. ...................... | 340/436 |
| 5,777,563 | 7/1998 | Minissale et al. ...................... | 340/435 |
| 5,936,549 | 8/1999 | Tsuchiya ................................ | 340/903 |

*Primary Examiner*—Stephone Allen
*Attorney, Agent, or Firm*—Sughrue, Mion, Zinn, Macpeak & Seas, PLLC

[57] ABSTRACT

An animal body detecting system adapted to be mounted on a vehicle is capable of simply and accurately detecting whether or not an animal exists, i.e. for detecting a distance to an object in front of the vehicle and for discriminating whether or not the object is an animal at the same time, by utilizing electromagnetic waves. The system is comprised of transceiver devices for emitting a radio wave of a first frequency of 10 GHz and that of a second frequency of 60 GHz whose frequency is higher than the first frequency in the same direction and for receiving reflected waves; and discriminating devices for generating material detection data indicative of whether or not a combination, i.e. a ratio or a product, of receiving levels of the reflected waves of the respective frequencies is a combination of the case when the reflecting object is an animal body. It further comprises a detector for detecting a distance to the reflecting object based on the emitted waves and the received reflected waves. The system utilizes the discrimination result of whether or not the object is an animal and the measured distance thereto when traveling at night, in controlling the distance between vehicles and in controlling a vehicle speed.

6 Claims, 8 Drawing Sheets

ANIMAL BODY DETECTING SYSTEM UTILIZING ELECTROMAGNETIC WAVES

BACKGROUND OF THE INVENTION

1. Field of the Invention

The present invention relates to a system for detecting whether an object exists or not by utilizing electromagnetic waves and more particularly, to a system for discriminating whether or not the detected object is an animal, including a human. This system may be used as a vehicular front monitoring system for measuring a distance to an object existing ahead of the vehicle.

2. Description of Related Art

Hitherto, as a monitoring system of this sort, there have been systems of shooting a scene ahead of a vehicle by a camera and processing its image to discriminate an object existing ahead of the vehicle and of emitting laser beams or electromagnetic waves such as radio waves ahead of the vehicle to detect the wave reflected by an object existing ahead of the vehicle. Their ordinary purpose is to detect a distance to a preceding vehicle going ahead of the vehicle or an obstacle existing ahead of the vehicle. They can detect an object existing ahead of the lane of the vehicle and measure a distance to the object accurately on motor ways such as highways where pedestrians and bicycles are prohibited and which are standardized.

However, on ordinary roads, there are pedestrians and bicyclers who are coming and going on or near the road surface where vehicles travel or who try to cross the road. Further, even on a motor way, there is a case when a car stops at the road side to pick up or discharge passengers or when construction workers work there. Animals also often prowl on mountainous roads. It is hard to pedestrians, animals and bicyclers traveling adjacent roads especially in the night time. Hereinafter, man and other animals will be expressed simply as animals.

There has also been proposed a front monitoring system for sensing an animal by using an infrared camera. However, because the infrared camera senses infrared rays emitted from warm objects, it also reacts to road lamps, a head light of a vehicle running in the opposite direction, a muffler and tires of a vehicle running ahead. Then, highly advanced shaped recognition technology or motion recognition technology must be combined with it in order to discriminate animals singularly, so that the monitoring system becomes costly. Furthermore, its discriminating accuracy is relatively low.

Although animals reflect radio waves whose wavelength is short and it is possible to detect reflected waves from animals, it is difficult to detect animals, e.g., a pedestrian, singularly because the intensity of the reflected wave from a metal having a high electrical conductivity is greater.

SUMMARY OF THE INVENTION

Accordingly, it is a primary object of the present invention to detect whether an animal exists or not by utilizing electromagnetic waves. A second object is to detect a distance to a front object and to discriminate whether or not the front object is an animal at the same time and a third object is to realize the determination as to whether or not it is an animal by a relatively simple technology.

In order to achieve the above-mentioned objects, the present invention system is constructed as follows.

(1) An inventive animal body detecting system utilizing electromagnetic wave comprises transceiver means (11, 12, 14 and 15) for emitting the electromagnetic wave of a first frequency (10 GHz) and that of a second frequency (60 GHz) whose frequency is higher than the first frequency substantially in the same direction and for receiving reflected waves from the front in the electromagnetic wave emitting direction; and discriminating means (16 and ECU 1) for generating information indicative of whether or not a combination of receiving levels of the received reflected waves of the respective frequencies is a combination of the case when the reflecting object is ax animal body.

It is noted that reference numerals of components or matters corresponding to those shown in the drawings and described later in a preferred embodiment are added in parentheses for reference so that the invention can be readily understood.

Although animals reflect radio waves of short wavelength and it is possible to detect the wave reflected from the animals, its reflectance differs depending on its wavelength (frequency) and on a physical property (electrical conductivity) of the object to which the radio wave hits. Table 1 shows receiving rates [(receiving intensity/transmitting intensity)×100%] obtained by emitting radio waves to several kinds of materials and by receiving the waves reflected from the materials in correspondence to frequencies of the emitted radio waves. Table 2 shows approximate sizes of the various materials shown in Table 1 and a distance between the materials and an antenna when the data in Table 1 is obtained.

TABLE 1

| FRONT OBJECT | RECEIVING INTENSITY/ TRANSMITTING INTENSITY (%) | | RATIO AND DETERMINATION BASED ON THAT | | | PRODUCT AND DETERMINATION BASED ON THAT | | |
| --- | --- | --- | --- | --- | --- | --- | --- | --- |
| | 10 GHz | 60 GHz | 10 GHz/ 60 GHz | THRESHOLD VALUE | DETERMINATION 1: ANIMAL 2: OTHERS | 10 GHz/ 60 GHz | THRESHOLD VALUE | DETERMINATION 1: ANIMAL 2: OTHERS |
| HAND | 0.3940 | 0.2396 | 1.6444 | 1.4 | 1 | 0.094 | 0.04 | 1.0 | 1 |
| TULIP | 0.0394 | 0.0332 | 1.1872 | 1.4 | 0 | 0.001 | 0.04 | 1.0 | 0 |
| PEAR | 0.0243 | 0.0212 | 1.1471 | 1.4 | 0 | 0.001 | 0.04 | 1.0 | 0 |
| PALM | 0.0098 | 0.0101 | 0.9695 | 1.4 | 0 | 0.000 | 0.04 | 1.0 | 0 |
| ORANGE | 0.0201 | 0.0210 | 0.9575 | 1.4 | 0 | 0.000 | 0.04 | 1.0 | 0 |
| RADISH | 0.0579 | 0.1193 | 0.4853 | 1.4 | 0 | 0.007 | 0.04 | 1.0 | 0 |
| PLATE (LUMBER) | 0.0368 | 0.1570 | 0.2345 | 1.4 | 0 | 0.006 | 0.04 | 1.0 | 0 |

TABLE 1-continued

| FRONT OBJECT | RECEIVING INTENSITY/ TRANSMITTING INTENSITY (%) | | RATIO AND DETERMINATION BASED ON THAT | | | PRODUCT AND DETERMINATION BASED ON THAT | | |
|---|---|---|---|---|---|---|---|---|
| | 10 GHz | 60 GHz | 10 GHz/ 60 GHz | THRESHOLD VALUE | DETERMINATION 1: ANIMAL 2: OTHERS | 10 GHz/ 60 GHz | THRESHOLD VALUE | DETERMINATION 1: ANIMAL 2: OTHERS |
| IRON | 1.4655 | 7.1200 | 0.2058 | 1.4 | 0 | 10.434 | 0.04  1.0 | 0 |
| CONCRETE | 0.0296 | 0.1713 | 0.1730 | 1.4 | 0 | 0.005 | 0.04  1.0 | 0 |
| INFORMATION | A | B | C | D | E | F | G | H |

TABLE 2

| | SIZE | DISTANCE TO ANTENNA |
|---|---|---|
| HAND | AREA: about 1300 mm² | 500 mm |
| TULIP | HEIGHT: about 280 mm | |
| PEAR | HEIGHT × WIDTH: about 120 mm × 150 mm | |
| PALM | HEIGHT: about 350 mm | |
| ORANGE | HEIGHT × WIDTH: about 100 mm × 120 mm | |
| RADISH | LENGTH × THICKNESS: about 300 mm × 80 mm | |
| PLATE (LUMBER) | 1000 mm² | |
| IRON | 1000 mm² | |
| CONCRETE | 1200 mm² | |

All of the plants have been measured by using the whole body without cutting.

Figure 5:
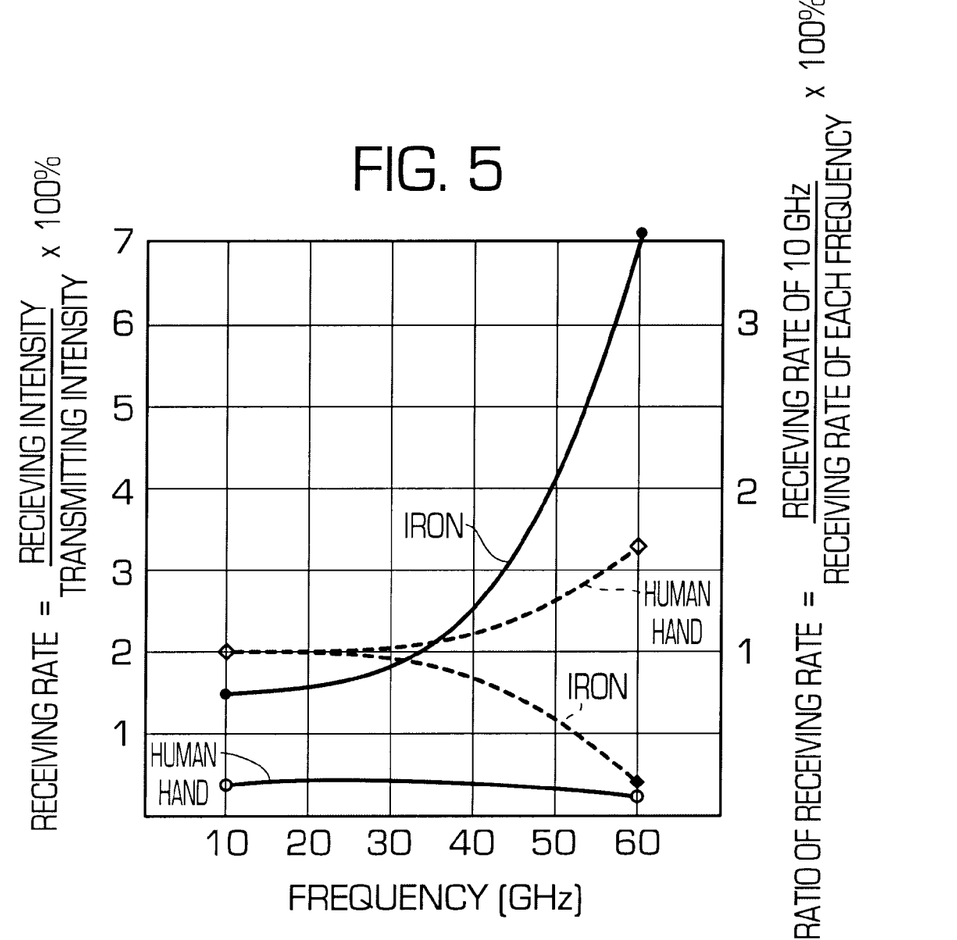
FIG. 5 is a graph showing receiving rates and a ratio of receiving rates when a radio wave is emitted to two kinds of objects (iron and hand).

FIG. 5 shows the receiving rates of iron and hand within a range from 10 to 60 GHz by alternate chain lines, The left vertical axis thereof represents values of tho receiving rates. The Figure also shows ratios of receiving rates within the range (receiving rate when 10 GHz/receiving rate when each frequency) by dotted lines. The right vertical axis represents values of the ratio of receiving rates.

Numerical values in Information Item A on Table 1 are receiving rates when the frequency of the radio wave is 10 GHz and those in Information Item B are receiving rates when the frequency is 60 GHz. Numerical values in Information Item c are the ratios of receiving rates (receiving rate when 10 GHz/receiving rate when 60 GHz).

Information Item D shows one exemplary threshold value for discriminating only animals based on the ratio of receiving rates and Information Item E shows binarized data when the ratio of receiving rates is binarized by the threshold value. "1" in the binarized data indicates that the ratio of receiving rates exceeds the threshold value, meaning that an object is a hand (animal) in this case. "0" in the binarized data indicates that the ratio of receiving rates is less than the threshold value, meaning that the object is not a hand (animal) in this case.

Numerical values in Information Item F on Table 1 are products of receiving rates (receiving rate when 10 GHz× receiving rate when 60 GHz). Those in Information Item G are pairs of threshold values for discriminating only animals based on the product of receiving rates and those in Information Item H are binarized data showing that the product of receiving rates is within the range of the pairs of the threshold values (animal) or is out of the range (not animal). "1" in this binarized data indicates that the product of receiving rates is within the range between the pair of threshold values, meaning that an object is a hand (animal) in this case. "0" in the binarized data indicates that the product of receiving rates is out of the range, meaning that the object is not a hand (animal) in this case.

When the transmitting intensity of the radio wave of 10 GHz is denoted by $E_{T10}$ and the reflected wave receiving intensity by $E_{R10}$ and the transmitting intensity of the radio wave of 60 GHz is denoted by $E_{T60}$ and the reflected wave receiving intensity by $E_{R60}$ in the example described above, their receiving rates are expressed as follows:

$$\text{Receiving Rate of Radio Wave of 10 GHZ} = (E_{R10}/E_{T10}) \times 100(\%) \quad (1)$$

$$\text{Receiving Rate of Radio Wave of 60 GHZ} = (E_{R10}/E_{T10}) \times 100(\%) \quad (2)$$

The ratio of their receiving rates are then expressed as follows:

$$\text{Ratio of Receiving Rates of Radio waves of Both Frequencies} = (E_{R10}/E_{T10})/(E_{R60}/E_{T60})$$

$$= (E_{R10}/E_{R60})/(E_{T60}/E_{T10}) \quad (3)$$

The transmitting intensities $E_{T10}$ and $E_{T60}$ of both radio waves are constant values (fixed values) defined by transmitters, so that they are defined as a constant value (constant) also here, like:

$$Kr = (E_{T60}/E_{T10}) \quad (4)$$

Then, the ratio of receiving rates of the radio waves of both frequencies turns out as follows:

$$\text{Ratio of Receiving Rates} = Kr \cdot (E_{R10}/E_{R60}) \quad (5)$$

Accordingly, the ratio of receiving rates can be found immediately from a ratio of receiving levels ($E_{R10}/E_{R60}$) of both frequencies. In other words, when the threshold value in Information Item D is changed to what (threshold value 1.4/Kr in Table 1) accommodates to the ratio of receiving levels ($E_{R10}/E_{R60}$), it becomes possible to discriminate whether or not the object reflecting the radio waves is an animal by comparing the ratio of receiving levels ($E_{R10}/E_{R60}$) with the threshold value accommodating to the ratio of receiving levels. That is, it is possible to discriminate whether or not the object is an animal based on the combination of the receiving levels of both frequencies.

Similarly, a product of their receiving rates is expressed as follows:

$$\text{Product of Receiving Rates of Radio Waves of Both Frequencies} = (E_{R10}/E_{T10})/(E_{R60}/E_{T60}) \quad (6)$$

$$= (E_{R10}/E_{R60})/(E_{T10}/E_{T60}) \quad (7)$$

The transmitting intensities $E_{T10}$ and $E_{T60}$ of both radio waves are constant values (fixed values) which are defined normally by transmitters, so that they are set as a constant value (constant) also here, like:

$$K_T = 1/(E_{T10} \times E_{T60}) \quad (8)$$

Then, the product of receiving rates turns out as follows:

Product of Receiving Rates of Radio Waves of Both $$\text{Frequencies} = K_T \cdot (E_{R10} \times E_{R60}) \quad (9)$$

Accordingly, the product of receiving rates can be found immediately from a product of receiving levels $E_{R10} \times E_{R60}$ of both frequencies. In other words, when the threshold value in the Information Item F is changed to what (threshold values $0.04/K_T$ and $1.0/K_T$ in Table 1) accommodate to the product of receiving levels ($E_{R10} \times E_{R60}$), it is possible to discriminate whether or not the object reflecting the radio waves is an animal by comparing the product of receiving levels ($E_{R10} \times E_{R60}$) with the threshold values accommodating to the product of receiving levels. That is, it is possible to discriminate whether or not the object is an animal based on the combination of the receiving levels of both frequencies.

As described above, the present invention allows the object to be discriminated whether or not it is an animal relatively simply and accurately because it is discriminated based on the combination of the receiving levels of the different frequencies.

Figure 6:
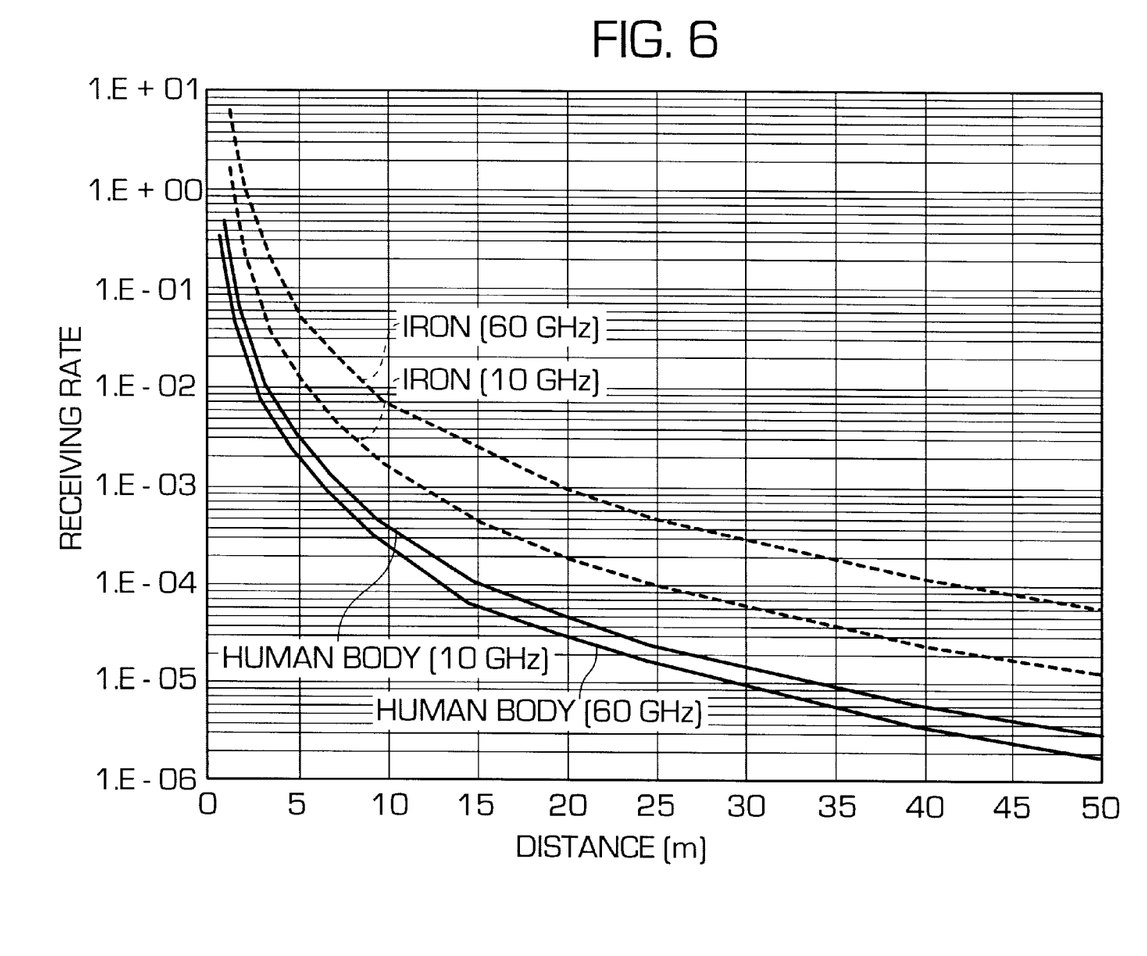
FIG. 6 is a graph showing a relationship between distance and receiving rates of the hand (described as a human body in FIG. 6) and the iron shown in Table 2.

However, when the distance to the reflecting object is not constant, the receiving levels $E_{R10}$ and $E_{R60}$ vary depending on the distance. FIG. 6 shows a relationship between the distance and the receiving rates of the hand (described as a human body in FIG. 6) and iron shown in Table 2. It is noted that the graph shown in FIG. 6 represents values calculated by using the radar equation based on the receiving rates (receiving intensity/transmitting intensity when the distance is 500 mm) as shown in Table 1.

Because the product of receiving levels ($E_{R10} \times E_{R60}$) varies depending on the distance to the reflecting object, the object may be discriminated based on the product of receiving levels whether it is an animal or not only when the object is substantially within a constant distance. Alternatively, it is necessary to measure the distance to the object to correct the threshold value or to correct the receiving level corresponding to the distance. With respect to the discrimination mode based on the product of receiving levels, a monitoring distance of a static monitoring system for discriminating whether or not an object exists at a specific location (fixed area) (whether the object enters or leaves) and whether or not it is an animal, for example, is limited (because it is substantially fixed), so that the threshold value or receiving levels need not be corrected substantially corresponding to the distance, allowing the object to be discriminated relatively simply and accurately.

It is possible to discriminate whether or not the object is an animal similarly also by the static monitoring system of this sort based on added values or subtracted values of the receiving rates or the receiving levels of both frequencies or by way of mapping for determining that the combination of the receiving rates or the receiving levels of both frequencies belongs to which realm section (animal/metal/others parameterized by them. These discrimination modes are applicable to the mode in which the distance to the object is not constant or not defined (in detecting an animal body existing ahead of a running vehicle for example) by measuring the distance to the object to correct the threshold value or to correct the receiving levels corresponding to the distance before the discrimination.

When the object is discriminated whether or not it is an animal based on the ratio of receiving levels ($E_{R10}/E_{R60}$), although each of the receiving intensities $E_{R10}$ and $E_{R60}$ varies depending on the distance to the object, each of the receiving intensities $E_{R10}$ and $E_{R10}$ change substantially in the same rate in the same direction with respect to the changes of the distance to the object. Accordingly, the change of their ratio, i.e. the change of the ratio of receiving levels ($E_{R10}/E_{R60}$) is small and the object may be discriminated whether or not it is an animal simply and at high precision even when the distance to the object is not constant or not defined.

(2) According to another mode of the invention, an animal body detecting system utilizing electromagnetic waves comprises transceiver means (11, 12, 14 and 15) for emitting the electromagnetic wave of a first frequency (10 GHz) and that of a second frequency (60 GHz) whose frequency is higher than the first frequency substantially in the same director and for receiving reflected waves from the front in the electromagnetic wave emitting direction; and discriminating means (16 and ECU 1) for generating information indicative of whether or not a ratio of receiving levels of the received reflected waves of the respective frequencies is a ratio of the case when the reflecting object is an animal body.

This is a mode of using the above-mentioned ratio of receiving levels ($E_{R10}/E_{R60}$) as a discriminatory parameter and allows the object to be discriminated whether or not it is an animal simply and at high precision even when the distance to the object (reflecting object) is not constant or not defined.

(3) The inventive animal body detecting system utilizing electromagnetic waves of the above-mentioned mode (2) further comprising means (12 and 13) for detecting the distance between the transceiver means (11, 12, 14 and 15) and the reflecting object based on the emitted wave of one frequency (10 GHz) and the received reflected wave. It allows the distance to the front object to be detected and the object to be discriminated whether or not it is an animal substantially in the same time.

(4) An inventive animal body detecting system utilizing electromagnetic waves comprises first transceiver means (11 and 12) for emitting the electromagnetic wave of a first frequency (10 GHz) and for receiving reflected waves from the front in the electromagnetic wave emitting direction; second transceiver means (14 and 15) for emitting the electromagnetic wave of a second frequency (60 GHz) whose frequency is higher than the first frequency in the direction in which the electromagnetic wave of the first frequency (10 GHz) is emitted and for receiving the reflected wave from the front in the electromagnetic wave emitting direction; means (12 and 13) for detecting a distance between the transceiver means (11 and 12) and the reflecting object based on the emitted wave of one frequency (10 GHz) and the received reflected wave; discriminating means (16 and ECU 1) for generating information indicative of whether or not a ratio of receiving levels of received reflected waves of the respective frequencies is a ratio of the case when the reflecting object is an animal body; and means (ECU 2 and 4) for disclosing the information and the distance.

It allows the distance to the reflecting object to be detected and the reflecting object to be discriminated whether or not it is an animal at the same time and allows them to be disclosed at the same time. This is a mode of using the above-mentioned ratio of receiving levels ($E_{R10}/E_{R60}$) as a discriminatory parameter and allows the object to be discriminated whether or not it is an animal simply and at high precision even when the distance to the object is not constant or not defined. This may be suitably used in the vehicle front monitoring system described above.

(5) The invention is also characterized in that in the animal body detecting system utilizing electromagnetic wave of the mode (3) or (4), the one frequency is the first frequency 10 GHz.

Because the receiving rate of a hand (animal) is relatively low and the receiving rate drops, though slightly, as the frequency increases as shown in FIG. 5, the low frequency radio wave is preferable to increase the detecting accuracy of the hand (animal) because its receiving rate is higher. Accordingly, the first frequency (10 GHz), i.e. the lower frequency, is set as the frequency for detecting the distance in this mode (5). It is noted that with respect to iron (metal: high electrical conductor), although its receiving rate of the high frequency radio wave is high, allowing the detecting accuracy to be high, its receiving rate of the first frequency (10 GHz), i.e. the lower frequency, is still higher than the receiving rate of hand (animal), so that the detecting accuracy of iron (e.g. a vehicle) is not hampered so much at a short distance.

The above and other objects, features and advantages of the present invention will be more apparent and more readily appreciated from the following detailed description of preferred exemplary embodiment of the present invention, taken in connection with the accompanying drawings.

DETAILED DESCRIPTION OF THE INVENTION

Figure 1:
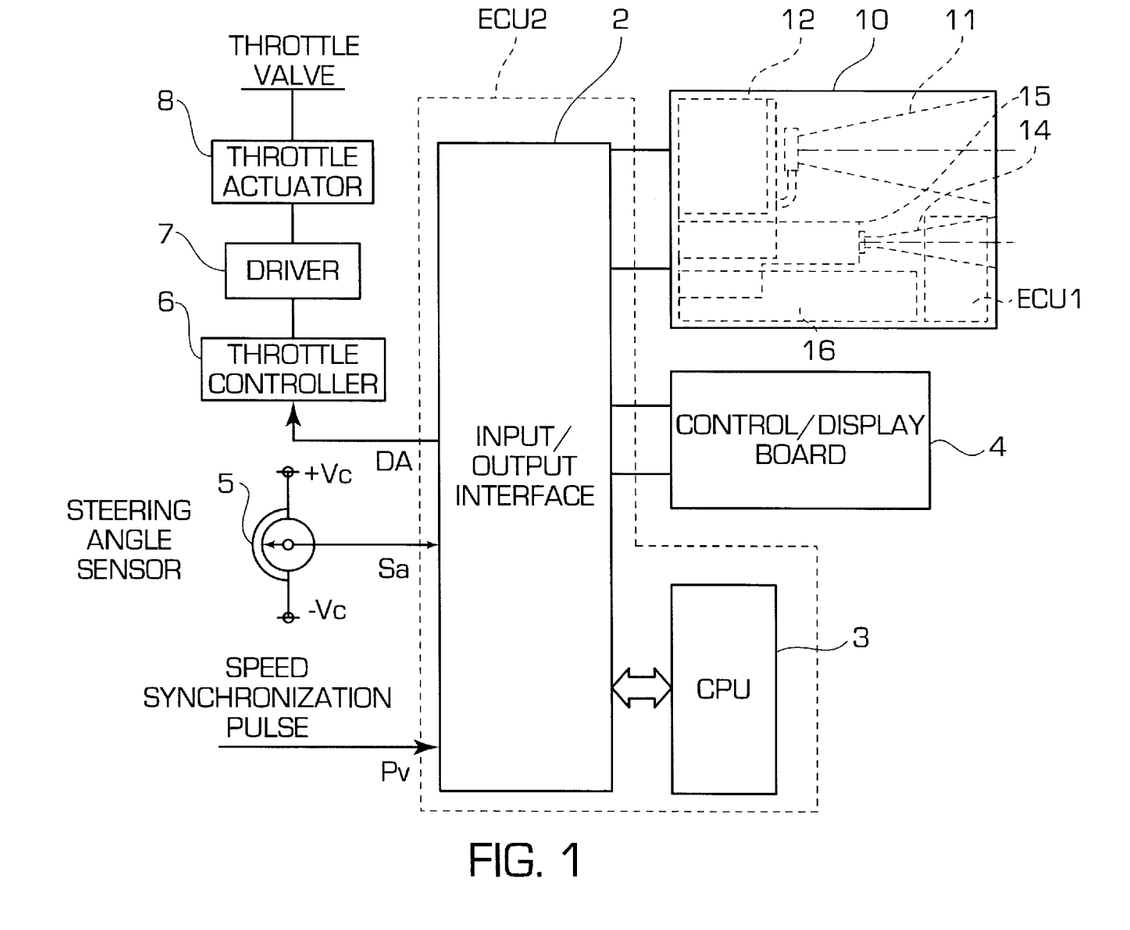
FIG. 1 is a block diagram showing a structure of vehicle front monitoring system comprising a front object monitoring unit according to one embodiment of the present invention.

FIG. 1 shows one embodiment of the present invention. This embodiment is realized in a vehicular front monitoring system which is provided in a vehicle having an internal combustion engine. A front object monitoring unit 10 utilizing electromagnetic waves is connected to an input/output interface (input signal processing circuit and output signal processing circuit) 2 of a host electronic control unit ECU 2. A CPU 3 issues a measure command to the front object monitoring unit 10 via the input/output interface 2.

Figure 2A:
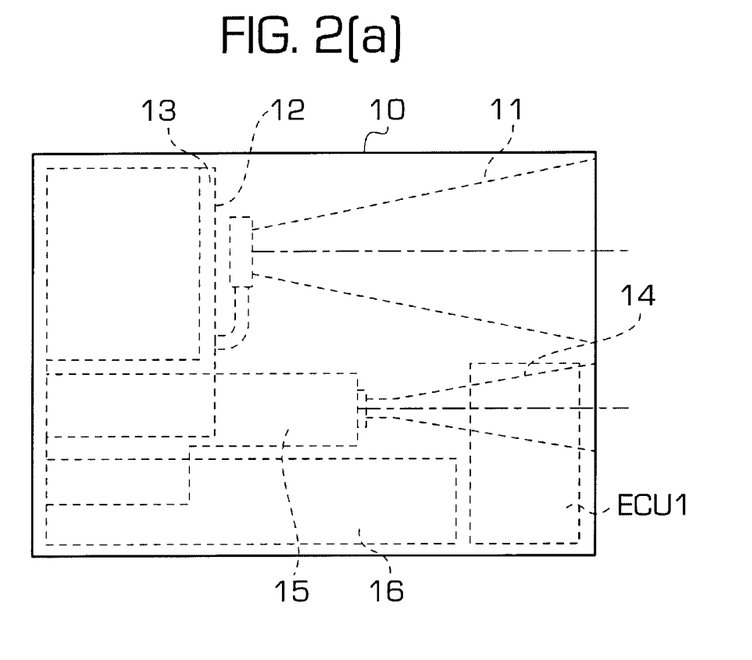
FIG. 2a is a side view of the front object monitoring unit shown in FIG. 1.
Figure 2B:
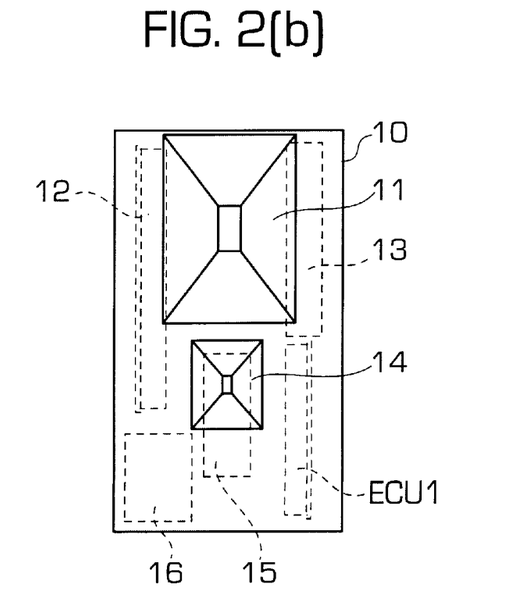
FIG. 2b is a front view of the front object monitoring unit shown in FIG. 1 when seen from the front side of the vehicle.

FIGS. 2a and 2b schematically show the structure of the front object monitoring unit 10. The front object monitoring unit 10 comprises a first antenna 11, opening to the front of the vehicle, for both emitting and receiving the radio wave of 10 GHz (first frequency) and a first transceiver 12 connected thereto, a second antenna 14, similarly opening to the front of the vehicle, for both emitting and receiving the radio wave of 60 MHz (second frequency) and a second transceiver 15 connected thereto, a level detector 16 for detecting a receiving level of each frequency and generating digital data indicative of that, a pulse count type wave analyzer 13 for measuring a frequency of a beat signal output by the first transceiver 12 and for converting it into distance information and an electronic control unit ECU 1 for giving FM pulses (frequency modulated synchronizing pulses) to the first transceiver 12 and for reading the output (level data) of the level detector 16 as well as the output (distance data) of the wave analyzer 13. The ECU 1 is connected to the input/output interface 2.

Similarly to the host ECU 2, the ECU 1 comprises mainly a CPU and an input/output interface (not shown). When the host ECU 2 issues a monitoring command (monitor ON) to the ECU 1, it turns on the transceivers 12 and 15, the level detector 16 and the wave analyzer 13, issues FM pulses to the first transceiver 12 at constant cycle, reads the level data (output by the level detector 16) and the distance data (output by the wave analyzer 13) substantially at constant cycle and calculates the ratio of receiving rates every time in reading them:

$$\text{Ratio of Receiving Rates} = Kr \cdot (E_{R10}/E_{R60}) \tag{5}$$

where, Kr is a coefficient (fixed value) defined based on output powers (designed values) of transmitters of the transceivers 12 and 15, $E_{R10}$ is a receiving level of the reflected wave of the first frequency of 10 GHz, i.e. the value indicated by the output data of the level detector 16, and $ER_{60}$ is a receiving level of the reflected wave of the second frequency of 60 GHz, i.e. a value indicated by the output data of the level detector 16. Then, the ECU 1 outputs material detection data and distance data read from the wave analyzer 13 to the host ECU 2 by indicating the material detection data as "1" representing an "animal" when the calculated ratio of receiving rates exceeds a threshold value (value corresponding to 1.4 in Information Item D in Table 1) and as "0" representing an "object other than animals" when the ratio is less than the threshold value.

Figure 3:
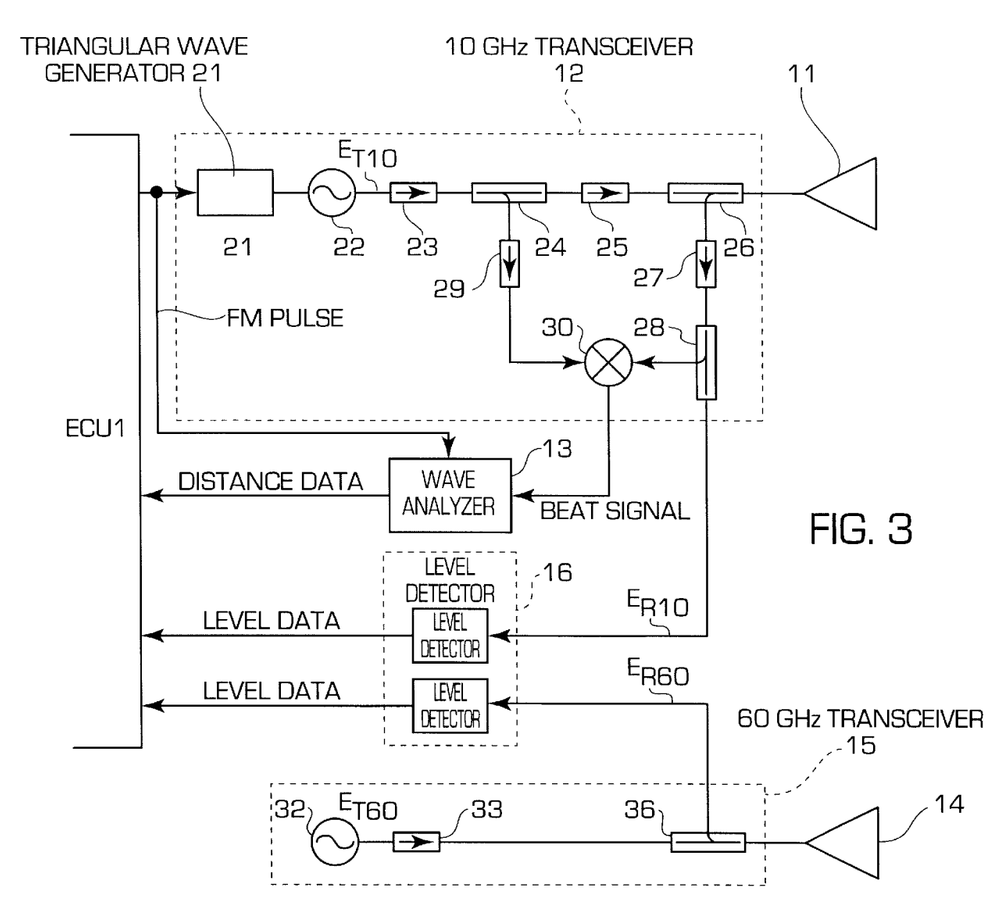
FIG. 3 is a block diagram showing a first transceiver and a second transceiver shown in FIG. 2.

FIG. 3 shows an outline of the structure of the first and second transceivers 12 and 15. According to the present embodiment, the first transceiver 12 and the first antenna 11 compose, together with the wave analyzer 13, an FM-CW radar for transmitting/receiving the radio wave of 10 GHz to detect a beat frequency caused by phase shift of the transmitted radio wave and the received reflected radio wave to calculate a distance to a front reflecting object.

A triangular wave generator 21 generates triangular waves synchronized with the FM pulses given by (the CPU within) the ECU 1 and supplies them to a voltage controlled variable frequency oscillator 22. While a center frequency of the signal generated by the oscillator 22 is 10 GHz, the frequency of the output signal of the oscillator 22 fluctuates within a range of 9.5 to 10.5 GHZ. This oscillating signal is applied to the horn antenna 11 via an isolator 23, a directional coupler 24, an isolator 25 and a directional coupler 26. Thereby, the frequency modulated radio wave of 9.5 to 10.5 GHz is emitted ahead of the vehicle.

When the ECU 11 receives part of the radio wave reflected from the front object, the received signal reaches a mixer 30 via the directional coupler 26, an isolator 27 and directional coupler 28. Meanwhile, a part of the transmitted signal is given to the mixer 30 via the directional coupler 24 and an isolator 29. The mixer 30 mixes the transmitted signal and the received signal to generate a signal of a beat frequency and gives it to the wave analyzer 13.

The wave analyzer 13 of the present embodiment measures the beat frequency by way of pulse count and outputs it by converting it into distance data (updates and sets it at an output latch). It is noted that the wave analyzer 13 may be what analyzes waveform components by fast Fourier transformation to calculate a distance to and a relative speed of each reflecting object which has brought about each component or may be comprised of a filtering system.

Part of the received signal is supplied to the level detector 16 via the directional coupler 28 and the level detector 16 calculates the receiving level $E_{R10}$ and updates and sets data indicative of that at an output latch destined for the first frequency.

The second transceiver 15 supplies the signal of 60 GHz generated by the oscillator 32 to the horn antenna 14 via an isolator 33 and a directional coupler 36. Thus, the radio wave of 60 GHz is emitted ahead of the vehicle. When part of the radio wave reflected from the front object is received by the antenna 14, the received signal is supplied to the level detector 16 via the directional coupler 36 and the level detector 16 calculates a receiving level $E_{R60}$ and updates and sets data indicative of that at an output latch destined for the second frequency.

Referring again to FIG. 1, a control/display board 4 for giving operation commands and setting conditions to the CPU 3 is connected to the input/output interface 2. The board 4 is provided with switches for commanding front monitoring, control on distance between cars and control on constant speed, an indicator lamp, a two-dimensional display and a buzzer. The CPU 3 reads the control or status of the switches via the input-output interface 2 and corresponding to that, turns the indicator lamp on/off and implements "Front Monitoring", "Control on Distance between Cars" and "Constant Speed Control" as described later.

Car speed synchronization pulses, each of which is generated per a predetermined small angle of a rotating axle, are supplied to the CPU 3 via the input/output interface 2. Then, the CPU 3 calculates the car speed by counting the pulse cycles of the car speed synchronization pulses. Further, a steering angle sensor 5 generates an analog signal indicative of a rotational angle of a steering wheel not shown and supplies it to the CPU 3. In the "Control on Distance between Cars" and "Constant Speed Control" described later, the CPU issues a signal instructing acceleration, hold, deceleration or cancel to a throttle controller 6.

Corresponding to that signal, the throttle controller 6 controls an actuator driver 7. The driver 7 drives a throttle actuator 8 coupled to a throttle valve (not shown) of the engine of the vehicle. For instance, when the CPU 3 instructs Acceleration, the throttle valve is driven and opened via the throttle controller 6, the driver 7 and the throttle actuator 8, an opening of the throttle valve is held as it is when the CPU 3 instructs Hold or the throttle valve is closed when the CPU 3 instructs Deceleration. When the CPU 3 instructs Cancel, a clutch between the throttle actuator 8 and the throttle valve is released and the throttle valve automatically returns to an idling position by return force of a return spring. It is the time when a driver of the vehicle releases an accelerator pedal. When the driver steps on the accelerator pedal, the throttle valve opens accordingly.

Figure 4:
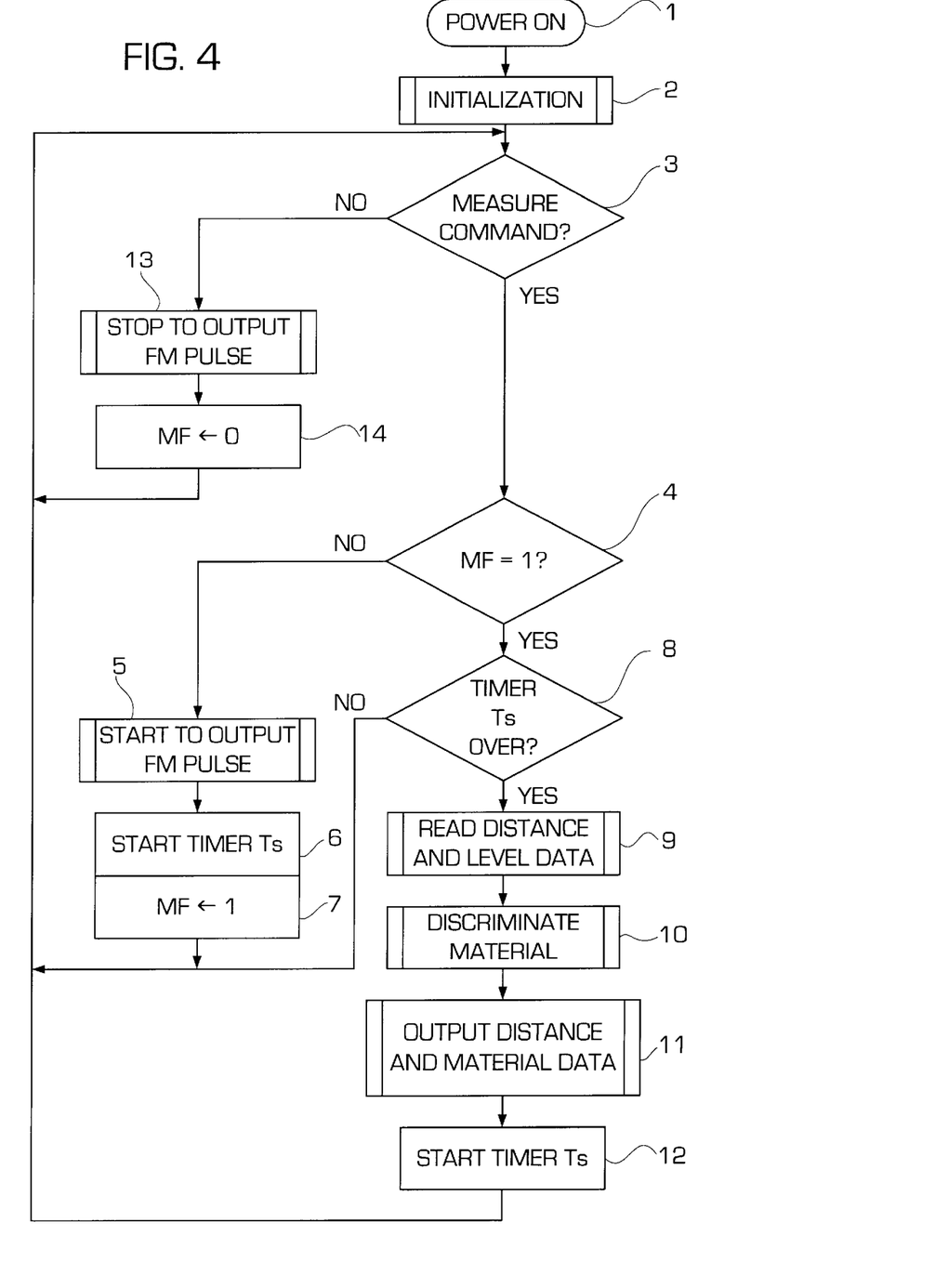
FIG. 4 is a flow chart showing an outline of an operation of an ECU shown in FIG. 3.

FIG. 4 shows a control operation of (the CPU within) the ECU 1 of the front object monitoring unit 10. When the ECU 1 is turned on, it clears an internal register, a counter and the like and sets a signal level at an input/output port to the input/output interface within the ECU 1 to that of the stand by state in Steps 1 and 2.

Next, the ECU 1 waits until when the host ECU 2 issue the measure command (command signal "1") in Step 3. It is noted that the host ECU 2 issues the measure command "1" to the ECU 1 when a head light switch of the vehicle is turned on or when "Front Monitoring", "Control on Distance between Cars" or "Constant Speed Control" is specified by the switch on the control board 4 and issues a measure cancel command "0" to the ECU 1 when the headlight switch is turned off and all of the "Front Monitoring", "Control on Distance between Cars" or "Constant Speed Control" are canceled.

When the host ECU 2 issues the measure command "1" to the ECU 1, the ECU 1 turns on the transceivers 12 and 15, the level detector 16 and the wave analyzer 13 and starts to output the FM pulses of constant cycle to the triangular wave generator 21 and the wave analyzer 13 in Step 5. Then, the ECU 1 starts a timer Ts of Ts time interval in Step 6 and writes "1" (indicative of on-measurement" to a register (one domain of an internal memory in the CPU) MF in Step 7. Then, it waits until the time of the timer Ts is over in Steps 7, 3, 4 and 8 and when the time is over, reads output data (distance data) of the wave analyzer 13 and output data (level data $E_{R10}$ and $ER_{60}$) of the level detector 16 in Step 9.

Next, it calculates the ratio of receiving rates.

$$\text{Ratio of Receiving Rates} = Kr \cdot (E_{R10}/E_{R60}) \qquad (5)$$

Kr is a coefficient (fixed value) defined based on the output power (designed value) of the transmitters of the transceivers 12 and 15, $E_{R10}$ is a receiving level of the reflected wave of the first frequency of 10 GHz, i.e. a value indicated by the output data of the level detector 16, and $E_{R60}$ is a receiving level of the reflected wave of the second frequency of 60 GHz, i.e. a value indicated by the output data of the level detector 16 as described before. Then, the ECU 1 outputs material detection data by indicating it as "1" indicating "animal" when the calculated ratio of receiving rates exceeds a threshold value TH (value corresponding to 1.4 in Information Item D in Table 1) and as "0" indicating "object other than animals" when the ratio is less than the threshold value TH in Step 10.

Next, the ECU 1 outputs this material detection data and the distance data read from the wave analyzer 13 to the host ECU 2 (updates and sets at the output latch to the host ECU 2) in Step 11. Then it restarts the timer Ts in Step 12 and waits until the time of the timer Ts is over. Because the above-mentioned Steps 9 and 10 are repeated when the measure command is issued, the output data to the host ECU 2 is updated to the latest detected value with the cycle of Ts.

When the measure cancel command is issued, the ECU 1 recognized it at Step 3. The ECU 1 then stops to output the FM pulses, shuts off the power to the transceivers 12 and 15, the level detector 16 and the wave analyzer 13 in Step 13, clears the register MF in Step 14 and waits the measure command to come in Step 3.

Figure 7:
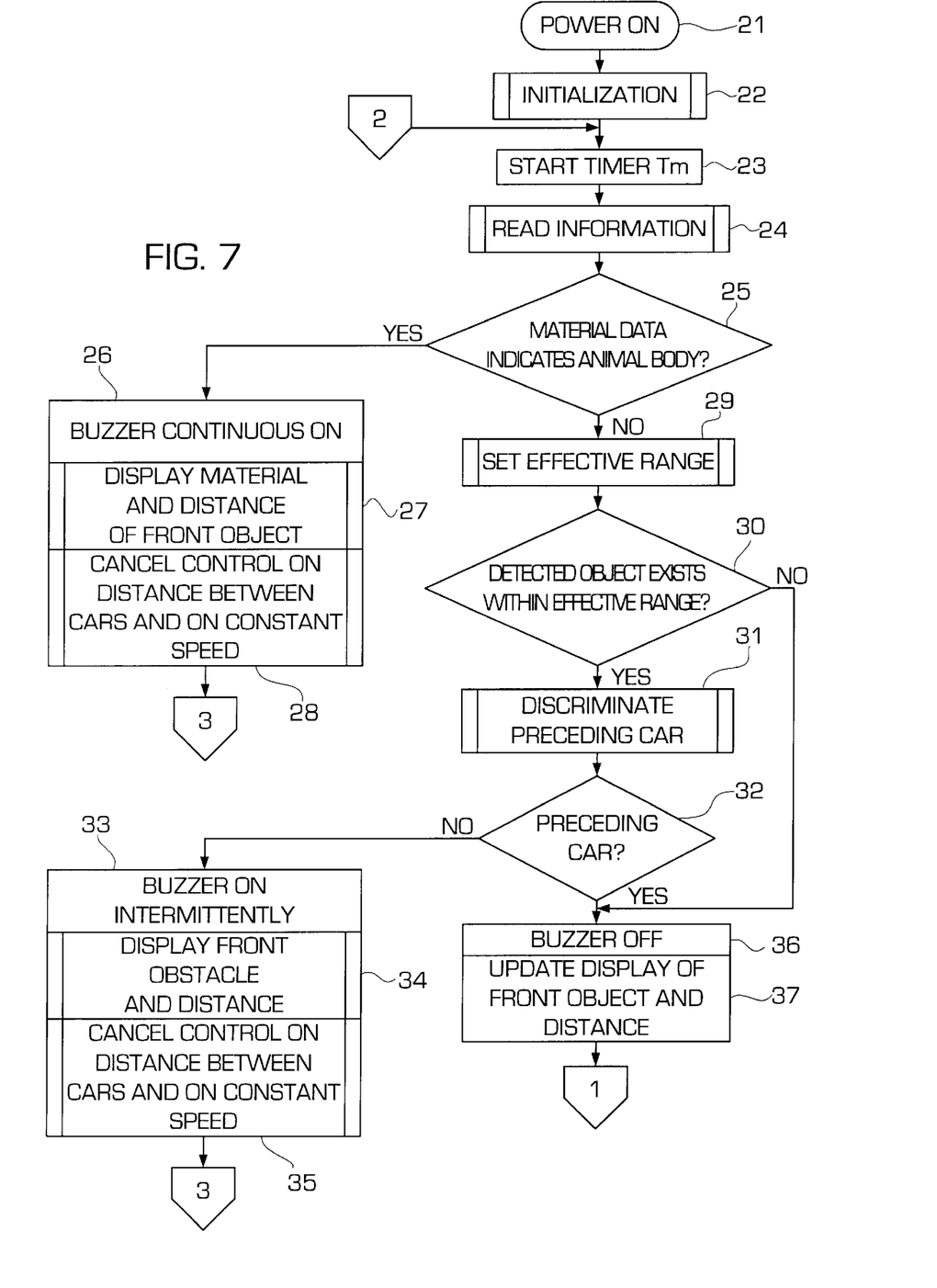
FIG. 7 is a flow chart showing a part of an outline of an operation of the CPU shown in FIG. 1.
Figure 8:
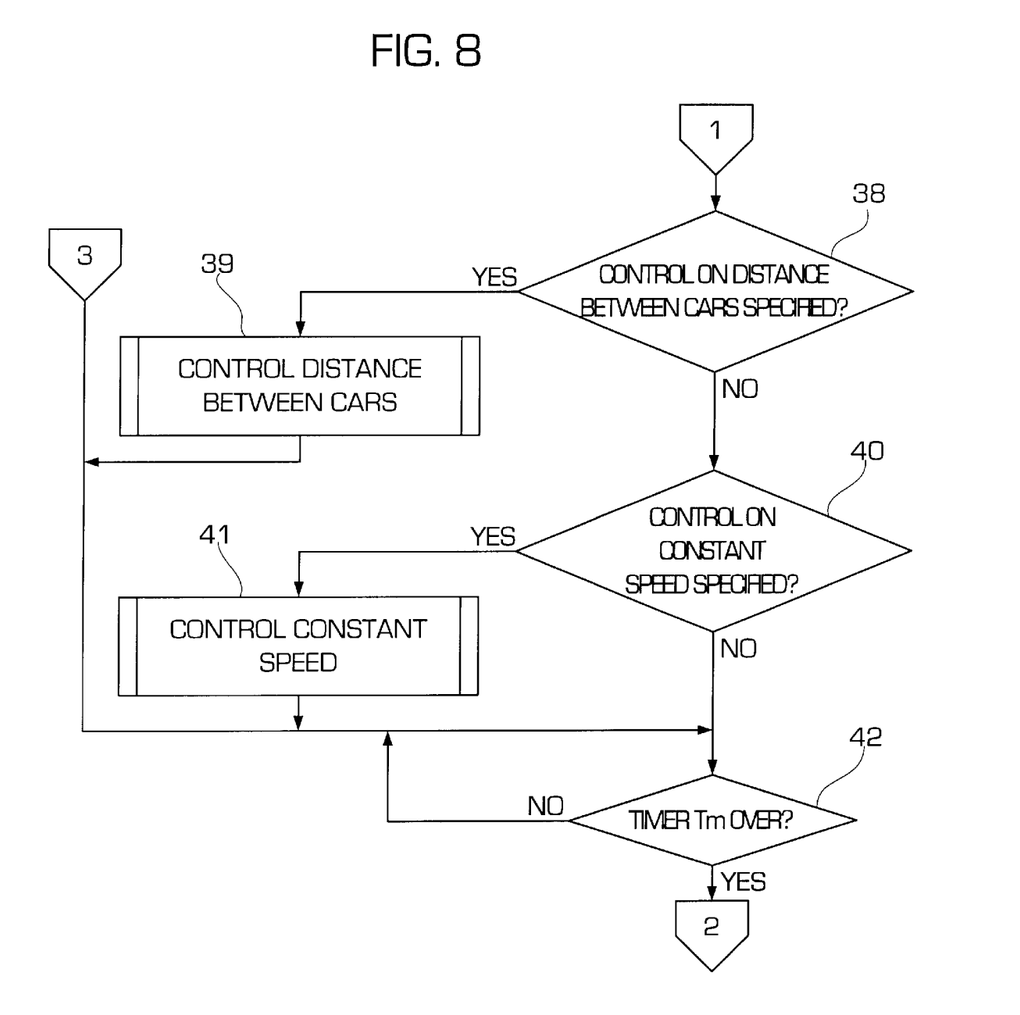
FIG. 8 is a flow chart showing a remaining part of the outline of the operation of the CPU shown in FIG. 1.

FIGS. 7 and 8 show a control operation of the CPU 3 of the host ECU 2 shown in FIG. 1. Referring first to FIG. 7, when the CPU 3 is turned on, it clears the internal register, the counter and the like and sets the signal level of the input/output port to the input/output interface 2 to that in the standby state in Steps 21 and 22. Next, the CPU 3 starts a timer Tm of time interval of Tm in Step 23.

Then it reads the status of the head light switch and command switches on the control board. When the head light switch and all of the command switches are off, the CPU 3 waits until the head light switch or any one of the command switches is turned on. When the switch is turned on, the CPU 3 issues the measure command ("1") to the ECU 1, reads an angle signal of the steering angle sensor 5 by converting from analog to digital and reads the output data (distance data and material detection data) of the ECU 1 in Step 24. It is noted that when the "Control on Constant Speed" command switch is turned on from off, the CPU 3 reads a car speed at that time to a target car speed register.

The CPU 3 checks the material detection data at first and when it turns out to be "1" (detecting an animal), the CPU 3 sets to continuously energize the buzzer on the control/display board 4 in Step 26. Thus, the buzzer continuously sounds. Next, the CPU 3 displays the material (here "pedestrian") indicated by the material detection date and a value indicated by the distance data on the two-dimensional display on the control/display board 4 in Step 27. Thus, a display "Pedestrian, at xxx m Ahead" is made. Next, the CPU 3 cancels "Control on Distance Between Cars" and "Control on Constant Speed" in Step 28. That is, it cancels the automatic drive of the throttle valve. Therefore, the throttle valve returns to the idling position when the accelerator pedal is not pressed. After finishing the above-mentioned processes, the CPU 3 waits until the time of the timer Tm is over.

When the material detection data is "0" (indicative of that it is not an animal) in Step 25, the CPU 3 decides a front monitoring effective range based on the steering angle data (data of the angle signal of the steering angle sensor 5 converted from analog to digital) and the car speed read in Step 24 in Step 29. That is, the effective range is defined such that the larger the steering angle or the slower the car speed is, the shorter the distance thereof in front of the vehicle becomes and the smaller the steering angle or the faster the car speed is, the longer the distance thereof in front of the vehicle becomes.

Next, the CPU 3 checks whether or not the distance data read in Step 24 is within the effective range thus defined in Step 30. When it is out of the effective range, there is no object within the effective range ahead of the vehicle, so that the CPU 3 turns off the buzzer (there is a case when it is not turned on) in Step 36 and displays on the two-dimensional display that "No Object Ahead" in Step 37.

When the distance data is within the effective range, the CPU 3 discriminates whether the object corresponding to the distance data is a preceding car or an obstacle in Step 31. Here, the CPU 3 calculates a relative speed of the detected object with respect to own vehicle from several past distance data and the distance data of this time and compares this relative speed with the car speed of own vehicle to discriminate whether the detected object is moving or is at a standstill. Then, the CPU 3 determines it as a preceding car when it is moving and as an obstacle when it is at a standstill. Then, determining it to be a preceding car, the CPU 3 turns off the buzzer in Step 36 and updates the display on the two-dimensional display as "Preceding Car, at xxx m Ahead" in Step 37. xxx m is a value represented by the distance data read this time in Step 24.

When it is determined to be an obstacle, the CPU 3 sets to buzz the buzzer intermittently in Step 33, updates the display on the two-dimensional display as "Obstacle, at xxx m Ahead" in Step 34 and cancels "Control on Distance Between Cars" and "Control on Constant Speed Control" in Step 35. Then, the throttle valve returns to the idling position when the accelerator pedal is not pressed. After finishing the above-mentioned processes, the CPU 3 waits until when the time of the timer Tm is over in Step 42.

Referring now to FIG. 8, when the front detected object is determined to be a preceding car and the display is updated in Steps 36 and 37 as described above, the CPU 3 checks in Steps 38 and 40 whether "Control on Distance Between Cars" or "Control on Constant Speed" is specified based on the status data of the command switches read in Step 24. When "Control on Distance Between Cars" is being specified, the CPU 3 executes "Control on Distance Between Cars" in Step 39 and when "Control on Constant Speed" is being specified, executes "Control on Constant Speed" in Step 41. When neither of them is specified, the CPU 3 waits until the time of the timer Tm is over in Step 42.

In "Control on Distance Between Cars" in Step 39, the CPU 3 reads a target distance corresponding to the steering angle and the car speed from a data table (one domain of the memory) to calculate a deviation of the measured distance with respect to the target distance. When the deviation deviates to the short distance side from an allowable range, the CPU 3 issues the deceleration command to the throttle controller 6 when the deviation deviates to the short distance side from an allowable range, issues the acceleration command to the throttle controller 6 when the deviation deviates to the long distance side from the allowable range and issues the hold command to the throttle controller 6 when the distance is within the allowable range.

When the car speed control command switch on the control/display board 4 is turned on, the CPU 3 writes the car speed at the time to the target car speed register. Then in "Control on Constant Speed" in Step 39, the CPU 3 calculates a deviation of the present car speed with respect to the target car speed in the target car speed register. The CPU 3 issues the deceleration command to the throttle controller 6 when the deviation deviates to the high speed side from an allowable range, issues the acceleration command to the throttle controller 6 when the deviation deviates to the low speed side and issues the hold command to the throttle controller 6 when it is within the allowable range.

After going through the above-mentioned processes, the CPU 3 waits until the time of the timer Tm is over in Step 42. Then when the time is over, it starts the timer Tm in Step 23 to implement the "Read Information" step in Step 24. Thus the CPU 3 repeats the "Read Information" step in Step 24 and the processes of Steps 25 through 42 described above with the cycle of Tm. It is noted that after detecting that the head light switch and all of the command switches are off in "Read Information" in Step 24, the CPU 3 issues the measure cancel command ("0") to the ECU 1. Further, when the command switch is turned off (canceled) during "Control on Distance Between Cars" or "Control on Constant Speed", the CPU 3 then cancels the control. Thereby the throttle valve returns to the idling position when the accelerator pedal is not pressed.

The measure command ("1") is issued to the ECU 1 by the operation of the CPU 3 of the host ECU 2 described above when the head light switch is ON (supposed to be the night time) or when the switch of the front monitoring command, the switch of the car distance control command or the switch of the constant speed control command is ON. Then, the host ECU 2 measures the distance to the front object and discriminates its material whether it is an animal or not. When all of the above mentioned switches are OFF, the measurement of distance and the discrimination of material are not carried out because Cancel Measure ("0") command is issued to the ECU 1.

When the head light is lit, the front object monitoring unit 10 automatically performs the measurement of distance and the discrimination of material of the front object without requiring the driver to command Front Monitoring. When it discriminates the front object as an "animal", the buzzer on the control/display board 4 sounds continuously and "Pedestrian, at xxx m Ahead" is displayed on the two-dimensional display.

While the invention has been particularly shown and described with reference to preferred embodiments thereof, it will be understood by those in the art that the foregoing and other changes in form and details may be made therein without departing from the spirit and scope of the invention.

What is claimed is:

1. An animal body detecting system utilizing electromagnetic waves, comprising:

transceiver means for emitting the electromagnetic wave of a first frequency and that of a second frequency whose frequency is higher than the first frequency substantially in the same direction and for receiving reflected waves from the front in the electromagnetic wave emitting direction; and discriminating means for generating information indicative of whether or not a combination of receiving levels of received reflected waves of the respective frequencies is a combination of the case when the reflecting object is an animal body.

2. An animal body detecting system utilizing electromagnetic waves, comprising:

transceiver means for emitting the electromagnetic wave of a first frequency and that of a second frequency whose frequency is higher than the first frequency substantially in the same direction and for receiving reflected waves from the front in the electromagnetic wave emitting direction; and discriminating means for generating information indicative of whether or not a ratio of receiving levels of received reflected waves of the respective frequencies is a ratio of the case when the reflecting object is an animal body.

3. The animal body detecting system utilizing electromagnetic waves according to claim 2, further comprising means for detecting a distance between said transceiver means and the reflecting object based on the emitted wave of one frequency and the received reflected wave.

4. The animal body detecting system utilizing electromagnetic waves according to claim 3, wherein said one frequency is the first frequency.

5. An animal body detecting system utilizing electromagnetic waves, comprising:

first transceiver means for emitting the electromagnetic wave of a first frequency and for receiving reflected waves from the front in the electromagnetic wave emitting direction;

second transceiver means for emitting the electromagnetic wave of a second frequency whose frequency is higher than the first frequency in the direction in which the electromagnetic wave of the first frequency is emitted and for receiving the reflected wave from the front in the electromagnetic wave emitting direction;

means for detecting a distance between said transceiver means and the reflecting object based on the emitted wave of one frequency and the reflected received wave;

discriminating means for generating information indicative of whether or not a ratio of receiving levels of received reflected waves of the respective frequencies is a ratio of the case when the reflecting object is an animal body; and means for informing of said information and said distance.

6. The animal body detecting system utilizing electromagnetic waves according to claim 5, wherein said one frequency is the first frequency.

* * * * *